July 12, 1927.
E. D. NERNEY
EYEGLASS CONSTRUCTION
Filed Jan. 4, 1924
1,635,799
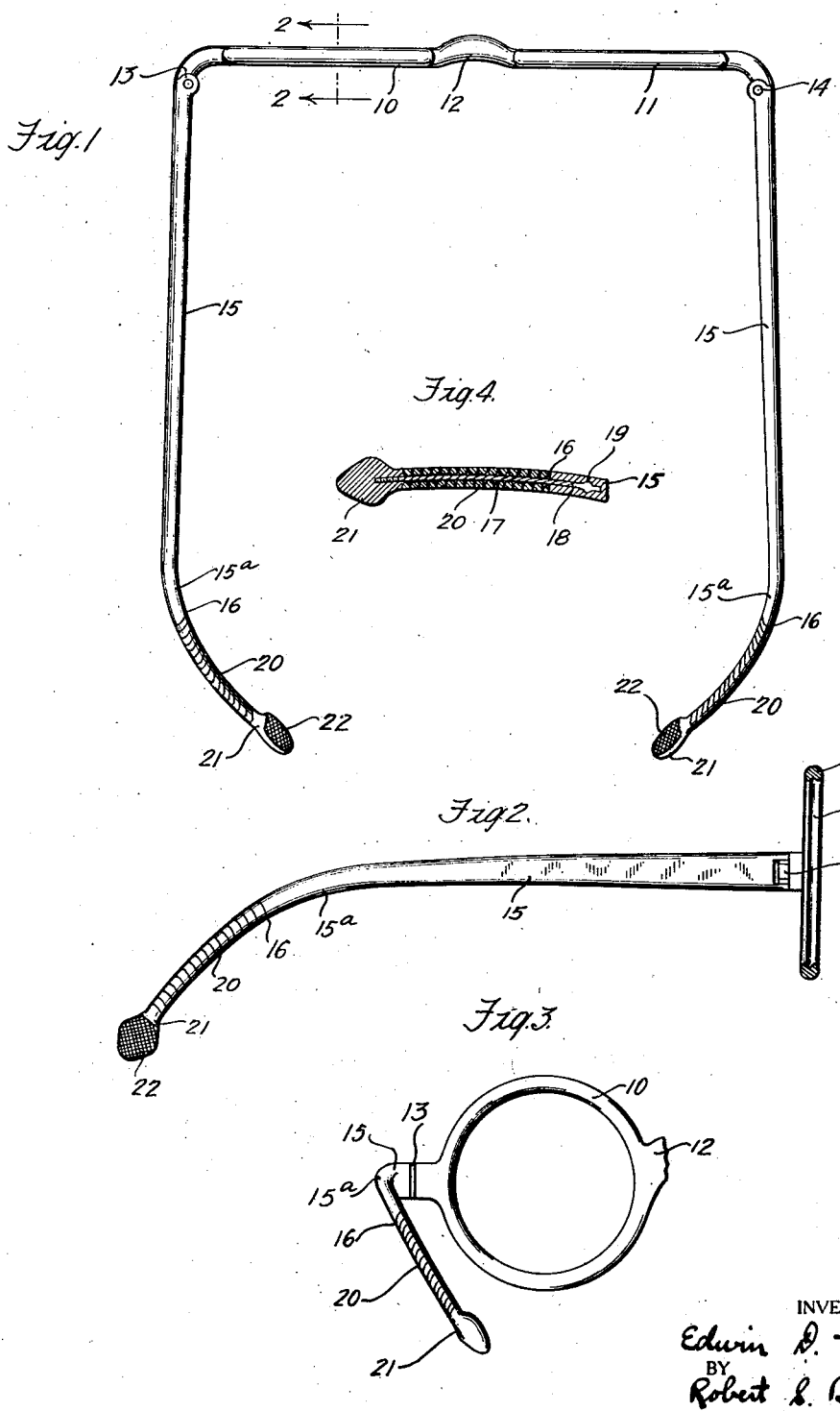
INVENTOR
Edwin D. Nerney
BY
Robert S. Blair
ATTORNEY Patented July 12, 1927.

1,635,799

UNITED STATES PATENT OFFICE.

EDWIN D. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed January 4, 1924. Serial No. 684,338.

This invention relates to construction for eyeglasses and with regard to its more specific features to construction for temple bars for eyeglasses.

One of the objects of the invention is to provide a construction of the above nature practical and efficient and capable of meeting the requirements of practical use in a highly dependable manner. Another object is to provide such a construction which is neat in appearance and conductive in a high degree to the comfort and convenience of the wearer. Another object is to provide a temple bar construction which will dependably hold the eyeglasses in the correct position upon the wearer. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a top plan view of a pair of eyeglasses, Figure 2 is a side elevation of one of the eyeglass temple bars, the eyeglass frame being sectioned as indicated by the line 2—2 of Figure 1 and the construction being viewed in the direction indicated by the arrows.

Figure 3 is an elevation viewed from the rear of the eyeglasses or from the left of Figure 2, and Figure 4 is a longitudinal section of the rear portion of one of the temple bars.

Similar reference characters refer to similar parts throughout the several views of the drawing.

Referring now to Figure 1 of the drawing in detail, there is shown an eyeglass frame comprising rims 10 and 11 adapted to support the lenses, and a bridge 12 therebetween. Temple bars are connected to the rims 10 and 11 as at 13 and 14 respectively by means of a suitable hinged connection comprising preferably a concealed hinge. The eyeglass frame shown in the drawing is of celluloid, but it is to be understood that the embodiment shown in the drawing is illustrative only and that an eyeglass frame employing metallic or non-metallic parts may be used as desired. It may be here noted that the term "celluloid" as employed herein is to be interpreted broadly throughout to comprehend various non-metallic substances of a nature similar to that of celluloid and adapted to form eyeglass frames and associated parts.

Considering now in general the shape of the temple bars shown in the drawing, it is seen that they extend rearwardly in a substantially straight line to the portion which is positioned substantially over the ear of the wearer. From this portion they are curved or bent toward each other, their extreme ends extending well around to the back of the head of the wearer. The curve of this bent portion preferably corresponds substantially to the curvature of the head of the wearer and the temple bars are bent downwardly and inwardly substantially following this contour. It is to be understood that by the term "inwardly" is meant a direction substantially from the side of the head toward the center thereof. The temple bars thus do not hook over the ears of the wearer, but rather their end portions curve around the head following the contour thereof and bear against the back portion of the head. Preferably the temple bars bear against the sides of the head over the ears substantially not at all, the holding of the eyeglasses in position being effected by the curved rear portions extending around to the back of the head. It will be seen that the bearing pressure of the temple bars against the head therefore is in a substantially forward direction. In this manner the tendency to bend the forward portions of the temple bars and to bow the eyeglass frame throwing the lenses out of the same plane is substantially avoided, as will be more fully explained hereinafter.

Considering now more particularly the construction of these temple bars, it may be here noted that since they are substantially identical, one only will be described in detail. The forward portion comprises a main body member 15 preferably of celluloid, the term "celluloid" being used broadly as hereinbefore mentioned. This main body portion extends rearwardly from its junction with the eyeglass frame substantially to the point 16. Secured to the rear end of the main body portion 15 is a metallic member 17 which thus forms a rearward extension. This metallic extension 17 is preferably secured to the body member 15 by being embedded in a recess 18 extending into the rear end of the member 15. Preferably the metallic member 17 is provided with projections such as 19 which embedded in the non-metallic member 15 serve to provide a firm anchorage and prevent the metallic extension 17 from turning in the recess 18 or being withdrawn therefrom. This metallic extension 17 is flexible being preferably formed of a spirally wound wire member whereby the desired degree of flexibility is attained.

About the metallic extension 17 is a celluloid covering 20 which is formed to be flexible and is adapted to be flexed with the flexible metallic member 17 which forms a core therefor. Preferably this celluloid covering 20 takes the form of a strip of celluloid spirally coiled about the core 17. The strip forming the spiral winding may be of any desired cross-section to best obtain the desired flexible properties of the covering, for example, it may have a rounded surface on its inner side resting against the core 17 and a flattened outer surface. The outer surface of the winding is preferably flattened in order to form a smooth, even surface for the flexible covering and the outer dimensions of the covering where it joins the end 16 of the member 15 preferably correspond substantially to the outer dimensions of the latter so as to form a smooth junction therewith. At the end 16 of the main body portion 15 the spiral covering 20 is secured by cementing or other suitable means.

The extreme rear end of the metallic core 17 is preferably threaded and threaded thereon is an end member 21 of celluloid. The rear end of the covering 20 is secured as by cementing to this end member 21 forming a smooth even connection therewith. This end member 21 is shaped to permit convenient insertion and removal through the hair of the wearer of the eyeglasses and is provided with a flattened and widened surface 22 on its side which bears against the head. This flattened surface 22 is also preferably roughened as by knurling. An advantageous shape for the end member 21 is the rounded arrowhead shape shown in the drawing which greatly facilitates slipping the ends of the temple bars through the hair in either direction.

As has been described these temple bars curve downwardly and inwardly following the contour of the head, the rear ends thereof extending well around to the back of the head. Preferably this curvature commences in the rear end portion of the main body member 15 as shown at 15ª. The remainder of the curved portion comprises the flexible core 17 with its flexible covering 20 and the end member 21.

The rear flexible portion comprising the flexible part 20 and the end member 22 therefor bears yieldingly against the rear portion of the head and this bearing pressure is in a substantially forward direction. The flexible end portion in yieldingly engaging the head takes up substantially all the bending occasioned by the holding pressure required to dependably maintain the eyeglasses in position. Thus there is substantially no tendency to bend the main body portion 15 and throw the eyeglass lenses out of the same plane. The eyeglasses are slipped into or out of place with the greatest convenience, the flexible ends of the temple bars yielding to permit their passage past the sides of the head over the ears. When in position these flexible ends yieldingly bear against the back portion of the head dependably and comfortably holding the eyeglasses in place. It will be noted that the flattened and roughened surfaces 22 of the tip members 21 are directed somewhat upwardly as well as forwardly since they bear against the lower portion of the back of the head where the curvature of the head is inwardly and downwardly. These surfaces 22 are preferably so positioned that their planes correspond to the planes of the portions of the surface of the head against which they bear and that the bearing pressure may be substantially normal to these surfaces 22.

The main body member 15 is preferably rounded on the outer side and flattened on the inner side. The flexible covering 20 is preferably correspondingly shaped, that is, its inner curved surface bearing against the surface of the head is preferably flattened as is best brought out in Figure 1. This may be done by softening the celluloid in any suitable manner and molding it to the desired shape. This flattened inner surface of the covering 20 is in such a plane throughout its extent that it corresponds to the plane of that portion of the surface of the head against which it bears. The tip member 21 is shaped to form a smooth, even junction with the end of the flexible covering and, as has been described, by its rounded arrowhead contour it greatly facilitates insertion and removal through the hair of the ends of the temple bars.

From the above it will be seen that there is herein provided a construction which embodies the features of this invention and attains the objects thereof and that the same is well adapted to meet the requirements of practical use in a highly advantageous manner.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In construction for eyeglass temple bars, in combination, a main body portion of celluloid, means at the forward end thereof for connection with an eyeglass frame, a metal member extending rearwardly from the rear end of said body portion and shaped to curve downwardly and inwardly toward the head, a celluloid end member secured to the rear end portion of said metal member, and a coiled celluloid covering about said metal member between the rear end of said body portion and the forward end of said end member, said celluloid end member having a widened part adapted to bear against the head and being tapered off rearwardly of said widened part.

2. In construction for eyeglass temple bars, in combination, a main body portion of celluloid, means at the forward end thereof for connection with an eyeglass frame, a metal member extending rearwardly from the rear end of said body portion and shaped to curve downwardly and inwardly toward the head, a celluloid end member secured to the rear end portion of said metal member, and a coiled celluloid covering about said metal member between the rear end of said body portion and the forward end of said end member, said celluloid end member having a widened surface adapted to bear against the head, and the forward end thereof being of lesser width and merging smoothly into said celluloid covering.

3. In construction for eyeglass temple bars, in combination, a main body portion of celluloid, means at the forward end thereof for connection with an eyeglass frame, a metal member extending rearwardly from the rear end of said body portion and shaped to curve downwardly and inwardly toward the head, a celluloid end member secured to the rear end portion of said metal member, and a coiled celluloid covering about said metal member between the rear end of said body portion and the forward end of said end member, said celluloid covering and said celluloid end member being both flattened on their surfaces facing toward the head.

4. In construction for eyeglass temple bars, in combination, a main body portion of celluloid, means at the forward end thereof for connection with an eyeglass frame, a metal member extending rearwardly from the rear end of said body portion and shaped to curve downwardly and inwardly toward the head, a celluloid end member secured to the rear end portion of said metal member, and a coiled celluloid covering about said metal member between the rear end of said body portion and the forward end of said end member, said celluloid end member having a flattened and roughened surface adapted to bear inwardly against the head.

5. In construction for eyeglass temple bars, in combination, a main body portion of celluloid, means at the forward end thereof for connection with an eyeglass frame, said main body portion curving downwardly at its rear end, a metallic member extending downwardly, rearwardly and inwardly from said curved rear end of said main body portion, and a flexible celluloid covering over said metallic member, said metallic member comprising a resilient core for said covering adapted to hold the same yieldingly in against the head when the temple bar is in use.

6. In construction for eyeglass temple bars, in combination, a main body portion of celluloid, means at the forward end thereof for connection with an eyeglass frame, a metallic member extending rearwardly from the rear end of said body member, and a flexible celluloid covering over said metallic member, said metallic member comprising a resilient spirally coiled wire member shaped to normally curve downwardly and inwardly and adapted to hold said celluloid covering snugly in against the head when the temple bar is in use, and a celluloid tip member at the rear end of said celluloid covering having a widened surface adapted to bear against the head under the urge of said resilient wire member.

7. In construction for eyeglass temple bars, in combination, a main body portion of celluloid, means for connecting the forward end thereof to an eyeglass frame, a flexible celluloid extension connected to the rear end of said main body portion and shaped to curve around to the back of the head, and a celluloid tip member at the end of said flexible extension, said tip member being widened to provide an enlarged bearing surface against the back of the head.

8. In construction for eyeglass temple bars, in combination, a main body portion of celluloid, means for connecting the forward end thereof to an eyeglass frame, a flexible celluloid extension connected to the rear end of said main body portion and shaped to curve around to the back of the head, and a celluloid tip member at the end of said flexible extension having a flattened surface adapted to bear upwardly and forwardly against the back of the head.

9. In construction for eyeglass temple bars, in combination, a main body portion of celluloid, means for connecting the forward end thereof to an eyeglass frame, a flexible metallic extension projecting from the rear end of said main body portion and curved inwardly, a flexible covering of celluloid upon said metallic extension, and a celluloid tip member at the extreme rear end of said metallic extension having a flattened surface adapted to bear against the head.

10. In construction for eyeglass temple bars, in combination, a main body portion of celluloid, means for connecting said main body portion to an eyeglass frame, a coiled celluloid extension connected to said main body portion and shaped to curve downwardly and inwardly and bear inwardly against a back portion of the head, a metal core within said coiled celluloid extension, and a celluloid tip member at the rear end of said coiled extension, said tip member being widened to provide an enlarged bearing surface against the head.

11. An eyeglass temple bar adapted for use with a non-metallic frame comprising, in combination, a forward and relatively rigid main body portion of celluloid, means at the forward end thereof for making connection with said frame, and a rear portion extending rearwardly from said forward portion and shaped to curve downwardly and rearwardly over the ear and inwardly to bear inwardly against the side of the head to hold the eyeglasses in place, said rear portion comprising a resilient metal core and a coiled celluloid covering about said core whereby said rear portion is adapted to yield outwardly under its gripping action against the head and to prevent bending forces from being transmitted along said relatively rigid main body portion to the frame.

In testimony whereof, I have signed my name to this specification this twenty-second day of December A. D. 1923.

EDWIN D. NERNEY.